(12) United States Patent
Siddiqi et al.

(10) Patent No.: US 10,454,794 B2
(45) Date of Patent: Oct. 22, 2019

(54) 3D WIRELESS NETWORK MONITORING USING VIRTUAL REALITY AND AUGMENTED REALITY

(71) Applicant: Cisco Technology, Inc., San Jose, CA (US)

(72) Inventors: Waseem Siddiqi, Campbell, CA (US); Mark Shurtleff, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 15/270,823

(22) Filed: Sep. 20, 2016

(65) Prior Publication Data
US 2018/0083848 A1    Mar. 22, 2018

(51) Int. Cl.
| | |
|---|---|
| H04L 12/26 | (2006.01) |
| H04W 24/08 | (2009.01) |
| H04L 12/24 | (2006.01) |
| G06F 3/048 | (2013.01) |
| H04L 29/06 | (2006.01) |

(52) U.S. Cl.
CPC ............ *H04L 43/045* (2013.01); *G06F 3/048* (2013.01); *H04L 41/22* (2013.01); *H04L 43/08* (2013.01); *H04L 67/38* (2013.01); *H04W 24/08* (2013.01)

(58) Field of Classification Search
CPC ..... H04L 43/045; H04L 41/22; G06T 15/005; G06T 19/006; H04W 24/08
See application file for complete search history.

(56) References Cited

U.S. PATENT DOCUMENTS

| | | | |
|---|---|---|---|
| 2012/0069131 A1* | 3/2012 | Abelow | G06Q 10/067 348/14.01 |
| 2014/0055490 A1* | 2/2014 | Mule | G06T 11/80 345/633 |
| 2016/0071325 A1* | 3/2016 | Callaghan | G06T 19/006 345/633 |
| 2017/0115376 A1* | 4/2017 | Kim | G01S 5/14 |
| 2017/0127289 A1* | 5/2017 | Belz | H04W 40/244 |
| 2017/0243400 A1* | 8/2017 | Skidmore | G02B 27/0172 |

OTHER PUBLICATIONS

D'Orazio, Dante, "See the Invisible Wireless Signals Around You With This Augmented Reality App", dated Nov. 28, 2015, http://www.theverge.com/2015/11/28/9811910/augmented-reality-applet, 3 pages.

* cited by examiner

*Primary Examiner* — Jeffrey M Rutkowski
*Assistant Examiner* — Chae S Lee
(74) *Attorney, Agent, or Firm* — Merchant & Gould P.C.

(57) ABSTRACT

A method for three dimensional wireless network monitoring that includes receiving endpoint device data at one or more access points and receiving wireless coverage data at the one or more access points. The method further includes transmitting the endpoint device data to a client device, wherein, when the endpoint device data is received by the client device, causes the client device to display an endpoint device indicator in a three dimensional graphic visualization using a first set of visual characteristics determined based on the endpoint device data; and transmitting the wireless coverage data to the client device, wherein, when the wireless coverage data is received by the client device, causes the client device to display a wireless coverage indicator in the three dimensional graphic visualization using a second set of visual characteristics determined based on the wireless coverage data.

20 Claims, 11 Drawing Sheets

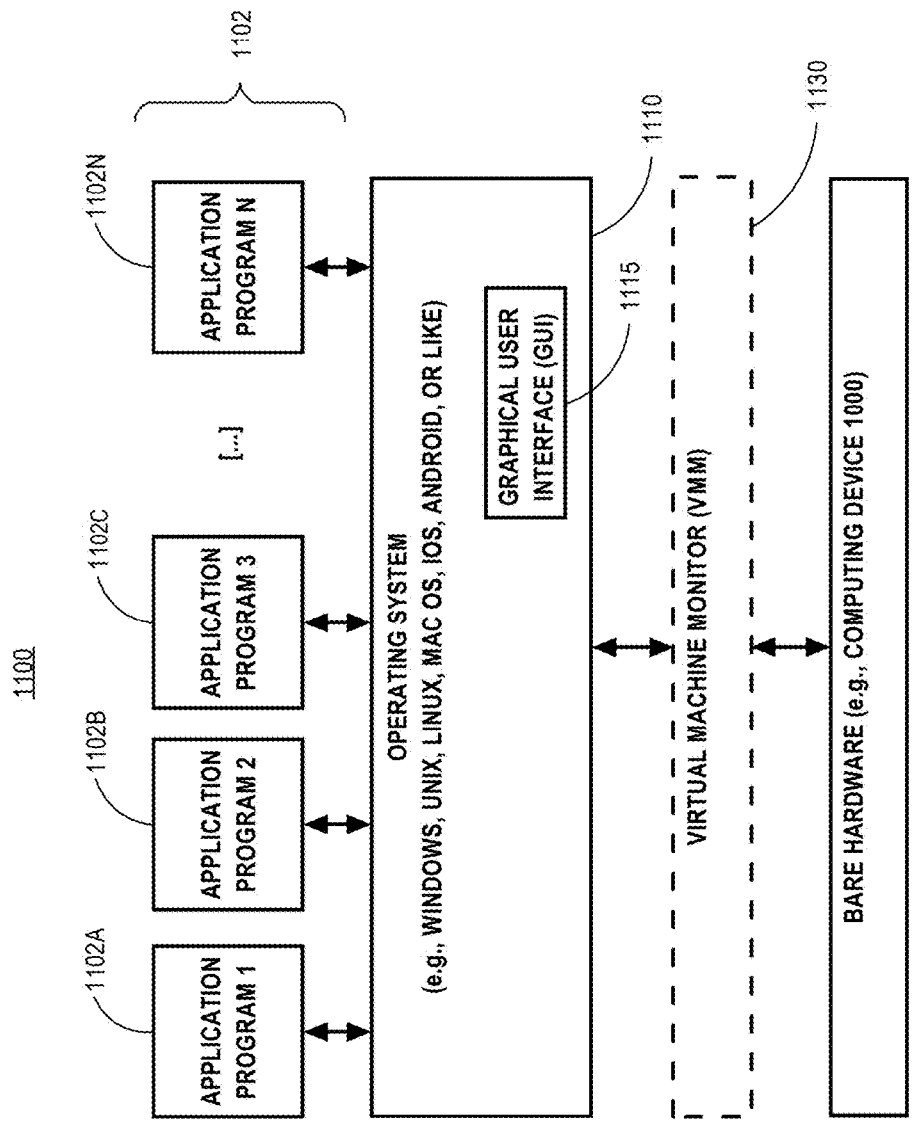

3D WIRELESS NETWORK MONITORING USING VIRTUAL REALITY AND AUGMENTED REALITY

TECHNICAL FIELD

The present disclosure relates to wireless network monitoring. More specifically, the disclosure relates to wireless network monitoring using virtual reality and/or augmented reality.

BACKGROUND

It can be challenging to monitor wireless networks. In particular, dynamic changes to wireless network topology, including changes to wireless coverage area, signal strength, interference, endpoint device positioning, and endpoint data consumption can be difficult to visualize simultaneously. The techniques described herein solve these problems and more by using virtual reality and/or augmented reality visualization to assist with wireless network monitoring.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 11 is a block diagram of a software system for controlling the operation of the computing device.

Figure 1:
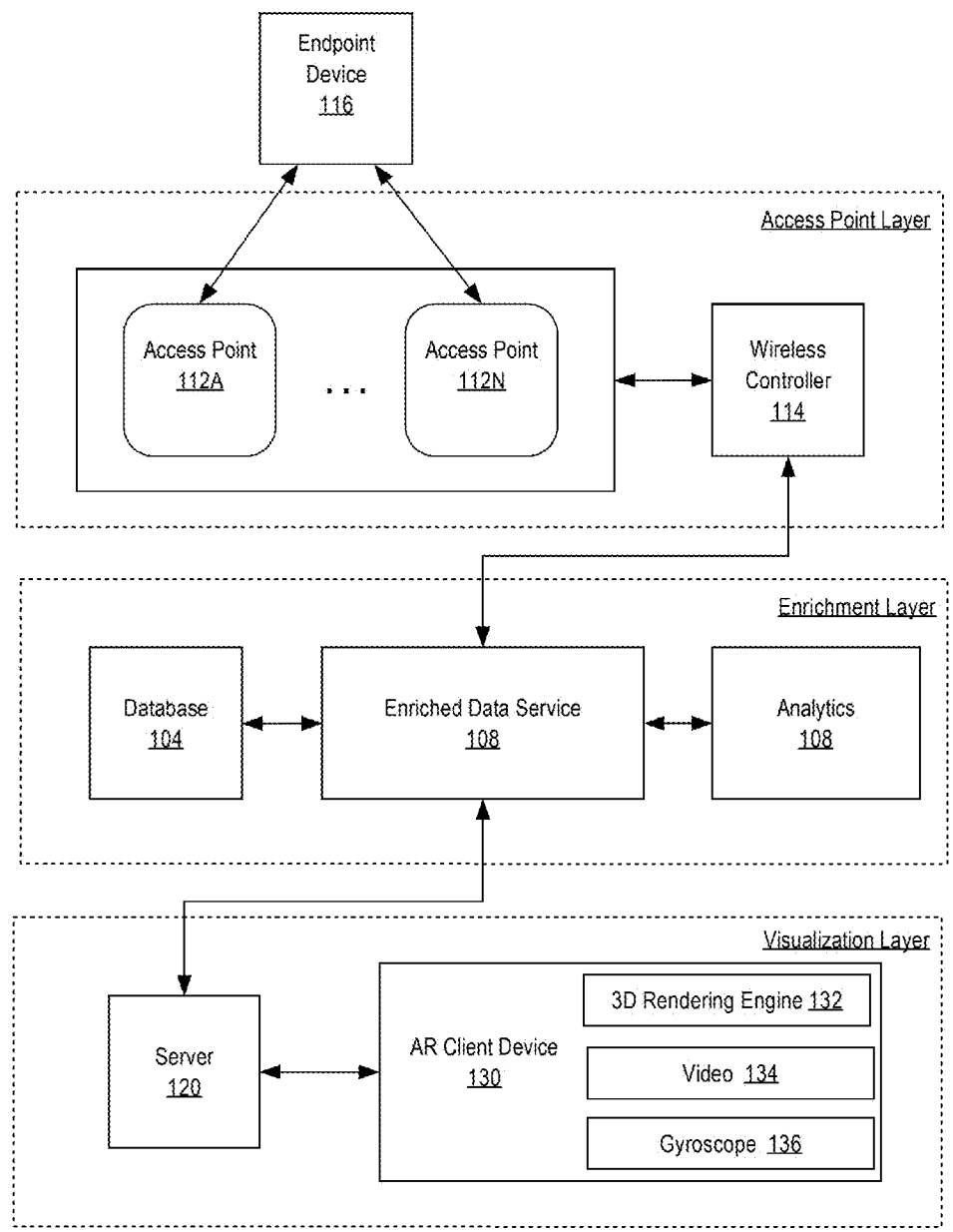
FIG. 1 is an example of a wireless network monitoring system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

1.0 Overview
2.0 Example System Implementation
3.0 Wireless Network Visualization
3.1 Wireless Coverage Indicator
3.2 Endpoint Device Indicator
4.0 Example Process
5.0 Example Applications
6.0 Implementation Mechanisms—Hardware Overview
7.0 Implementation Mechanisms—Software Overview
8.0 Other Aspects of Disclosure

1.0 Overview

Techniques are described herein for three dimensional (3D) wireless networking monitoring using augmented reality (AR) and/or virtual reality (VR).

Wireless networks include one or more access points. An access point may be defined as any transmitter for a wireless signal, and may include a wireless router, cellular base station, antenna, or any other similar transmitter. An access point generates a wireless coverage area for a wireless network. A wireless network may connect to one or more endpoint devices. An endpoint device may be defined as any computing device that is communicatively coupled to a wireless network via wireless transmission. Examples of endpoint devices include smartphones, tablet devices, desktop computers, laptop computers, printers, Internet-of-Things (IoT) devices, wearable devices, unmanned aerial vehicles (UAVs), robotic systems, or any other type of computing device that is capable of wireless transmission. Endpoint devices may communicate with an access point in a wireless network via one or more wireless transmission protocols, such as 802.11 a/b/g/n, Bluetooth, LTE, 3G, CDMA, or any other wireless protocol.

Wireless management applications provide a basic visualization of the performance of an access point, however, such visualization is displayed in two-dimensional ("2D") graphs that are displayed on a laptop, desktop, or mobile device. Such 2D graphs are not immersive, and do not allow a network administrator to visualize the network topology and performance of a wireless network dynamically.

Current 3D visualization technologies include augmented reality and/or virtual reality systems. Augmented reality is a computer-augmented view of a real physical environment whose elements are augmented by computer-generated sensory input, including graphics, video, sound, and other data. Augmented reality can be displayed as a graphic visualization on an augmented reality client device, such as an augmented reality headset or augmented reality-enabled smartphone. Virtual reality is a computer-generated view of a simulated physical environment. In some embodiments, virtual reality can be used to generate a view of a simulated physical environment that is analogous to a real physical environment. Virtual reality, like augmented reality, can include additional computer-generated sensory input, including graphics, video, sound, and other data. Virtual reality can be displayed as a graphic visualization on a virtual reality client device, such as a virtual reality headset.

The present disclosure provides techniques that utilize 3D visualization technologies to provide 3D wireless network monitoring of a wireless network in either an augmented reality or a virtual reality display. Thus, the present disclosure offers advantages over traditional wireless management applications limited to 2D graphs. The present disclosure generates a 3D graphic visualization of a wireless network that is dynamic and immersive. Thus, the present disclosure provide improved efficiencies for network administrators and other user that are interested in viewing the characteristics of the wireless network and troubleshooting its performance. For example, the present disclosure allows for users to easily navigate a wireless network and troubleshoot problems with its configuration in the physical world. Additionally, the present disclosure allows for users to identify unwanted endpoint devices in a wireless network.

In one embodiment, a method comprises receiving endpoint device data at one or more access points and receiving wireless coverage data at the one or more access point. The method comprises transmitting the endpoint device data to a client device, wherein, when the endpoint device data is received by the client device, causes the client device to display an endpoint device indicator in a three dimensional graphic visualization using a first set of visual characteristics determined based on the endpoint device data; and transmitting the wireless coverage data to the client device, wherein, when the wireless coverage data is received by the client device, causes the client device to display a wireless coverage indicator in the three dimensional graphic visualization using a second set of visual characteristics determined based on the wireless coverage data.

2.0 Example System Implementation

FIG. 1 illustrates an example wireless network monitoring system 100 in which the techniques described may be practiced, according to some embodiments. Wireless network monitoring system 100 is a computer-based system and may be implemented across one or more computing devices. The various components of wireless network monitoring system 100 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer, or general-purpose computer, in various embodiments. Wireless network monitoring system 100 illustrates only one of many possible arrangements of components configured to execute the programming described herein. Other arrangements may include fewer or different components and the division of work between the components may vary depending on the arrangement.

Wireless network monitoring system 100 includes endpoint device 116. Endpoint device 116 may be any computing device communicatively coupled to a wireless network. For example, endpoint device 116 may include smartphones, tablet devices, desktop computers, laptop computers, printers, IoT devices, wearable devices, UAVs, or any other type of computing device that is capable of wireless transmission. Endpoint device 116 is communicatively coupled to one or more access points 112A through 112N via a wireless protocol. An access point 112 is any transmitter for a wireless signal, and may include a wireless router, cellular base station, antenna, or any other similar transmitter. In one embodiment, access points 112A through 112N are communicatively coupled to one another and can share information regarding the endpoint device 116.

In one embodiment, access points 112A through 112N are able to determine the position, or location, of the endpoint device 116. Position may include information regarding the latitude, longitude, and altitude of the endpoint device 116. Thus, the position of the endpoint device 116 represents the physical location of the endpoint device in the 3D real world. In one embodiment, access points 112A through 112N are able to determine the position of the endpoint device 116 by analyzing the received signal strength indicator (RSSI) received from the endpoint device 116. In one embodiment, the position of the endpoint device is determined by triangulating the RSSI received at each of three or more access points 112. For example, the RSSI can be determined based on one or more data packets transmitted from an endpoint device 116 to a particular access point. This calculation can be performed via three or more different access points in order to triangulate the position of the endpoint device 116. As the endpoint device 116 moves in the physical world, the values of the RSSIs change over time, thus allowing the access points 112 to dynamically calculate the changing position of the endpoint device 116 over time.

In another embodiment, each access point 112 is able to determine, by itself, the position of endpoint device 116 using the angle of arrival of the wireless signal between the access point and the endpoint device 116 in addition to the RSSI of the data packet in order to determine the position of the endpoint device 116. Thus, according to this embodiment, only a single access point is needed to determine the position of an endpoint device 116, as triangulation is not required. The position of the endpoint device 116 can be updated in real time when the endpoint device changes its positions, as the angle of arrival and the RSSI will change as well.

Access points 112A through 112N can additionally perform packet sniffing on data packets received from endpoint device 116 or sent to endpoint device 116 in order to generate packet sniffing data regarding the endpoint device 116. Packet sniffing data may include any data regarding the endpoint device 116 that can determined based on analyzing the contents of data packets transmitted to or from the endpoint device 116. Packet sniffing data may include data regarding the type of data being uploaded or downloaded by the endpoint device 116. For example, packet sniffing data may include data regarding the types of applications that are downloading and/or uploading data, such as email, web browsing, music streaming, etc. Packet sniffing data may include data regarding the protocols used by the endpoint device, such as HTTP, HTTPS, RTP, etc.

Access points 112A through 112N can additionally receive and/or generate wireless coverage data regarding the wireless network coverage area being generated by the access point. For example, wireless coverage data may include data regarding the signal strength of the wireless network, the channel(s) used, as well as the size and shape of the wireless coverage area generated by the access point.

Access points 112A through 112N are communicatively coupled to wireless controller 114. A wireless controller 114 is a computing device that is configured to manage access points 112A through 112N. For example, a wireless controller 114 may handle load balancing between access points, interference detection and avoidance between access points, coverage detection, and other coordination across multiple access points to ensure the health of the wireless network. Access points 112A through 112N can thus transmit data to wireless controller 114, including position data regarding endpoint device 116, endpoint device characteristics data of endpoint device 116, and/or wireless coverage data from access points 112A through 112N.

In one embodiment, wireless controller 114 is communicatively coupled to enriched data service 108. Wireless controller 114 can thus send enriched data service 108 the data received from access points 112A through 112N, including position of the endpoint device 116, packet sniffing data, or wireless coverage data. Enriched endpoint device service 108 is a service that receives data from the wireless controller 114, such as endpoint device position, packet sniffing data, and wireless coverage data. Enriched data service 108 is configured to take the data received from wireless controller 114 and generate enriched data, by retrieving supplementary data from one or more additional systems. For example, enriched data service 108 may be communicatively coupled to database 104 and analytics 108. Thus, enriched data service 108 may use the data received from wireless controller 114 and retrieve additional supplementary data from database 104. Database 104 may include any supplementary data that may be helpful for visualization purposes, such as employee records, network authorization or permission policies, historical wireless network access information, the physical layout of the setting for the wireless network, or any other similar supplementary data. Similarly, analytics 108 may analyze the data received from the wireless controller 114 to provide additional insights into the data, via supplementary data. For example, wireless controller 114 may transmit data regarding the uptime of a particular endpoint device 116 in a wireless network. Analytics 108 can receive this uptime data from enriched data service and analyze it to determine a connectivity score for the endpoint device using historical data obtained from the database 104. Analytics can transmit the connectivity score, an example of supplementary data, to the enriched data service for inclusion in the enriched data. The data received from database 104 and analytics 108 is supplementary data regarding the endpoint device 116, the access points 112A through 112N, or the wireless network in general that may be helpful to be included in a visualization of the wireless network. Enriched data service collects the supplementary data from database 104 and/or analytics 108 and combines it with data received from the wireless controller 114 in order to generate enriched data. This enriched data is data regarding the endpoint device 116 and/or the access point 112A. Enriched data service 108 is communicatively coupled to server 120 and may transmit the enriched data to server 120.

Server 120 is communicatively coupled to an augmented reality client device 130. Server 120 thus transmits the received enriched data to AR client device 130. AR client device 130 is any augmented reality device, and may include an augmented reality headset or an augmented-reality enabled smartphone, tablet, or other computing device. AR client device 130 includes a 3D rendering engine 132 for rendering an augmented reality graphic visualization of the data received from server 120. AR client device 130 includes a video device 134 for capturing video from the real physical world where the AR client device 130 is located. AR client device 130 includes a gyroscope 136 for determining the orientation of the AR client device 130. AR client device may thus, using the 3D rendering engine 132, display a graphic visualization of the wireless network using enriched data received from the server 120 overlaid on a video received from video device 134. Further details regarding the graphic visualization of the data will be described herein.

Figure 2:
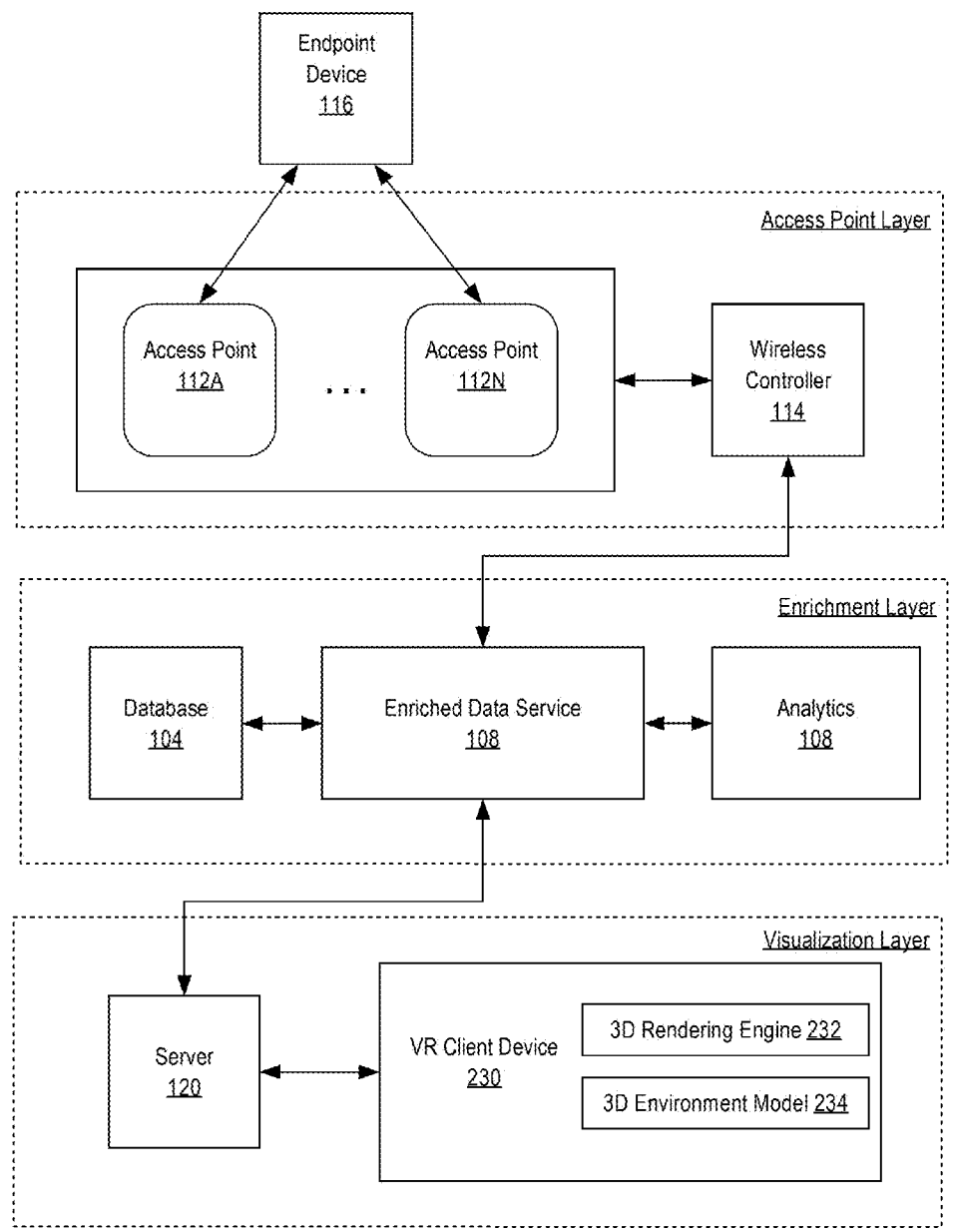
FIG. 2 is an example of a wireless network monitoring system, according to one embodiment.

FIG. 2 illustrates an example wireless network monitoring system 200 in which the techniques described may be practiced, according to some embodiments. Wireless network monitoring system 200 is implemented with virtual reality client device 230 instead of the AR client device 130 of wireless network monitoring system 100. VR client device 230 is communicatively coupled to server 120. Server 120 thus transmits the received enriched data to VR client device 230. VR client device 230 is any virtual reality device, and may include a virtual reality headset or a virtual-reality enabled smartphone or tablet device. VR client device 230 includes a 3D rendering engine 232 for rendering a virtual reality graphic visualization of the data received from server 120. VR client device 230 includes a 3D environment model 234 for rendering a 3D environment of a physical space based on data regarding the layout of the physical space. VR client device 230 may thus, using the 3D rendering engine 232 and the 3D environment model 234, display a graphic visualization of the wireless network using enriched data received from the server 120 in 3D environment of a physical space generated by 3D environment model 234. Further details regarding the visualization of the data will be described herein.

3.0 Wireless Network Visualization

Figure 3:
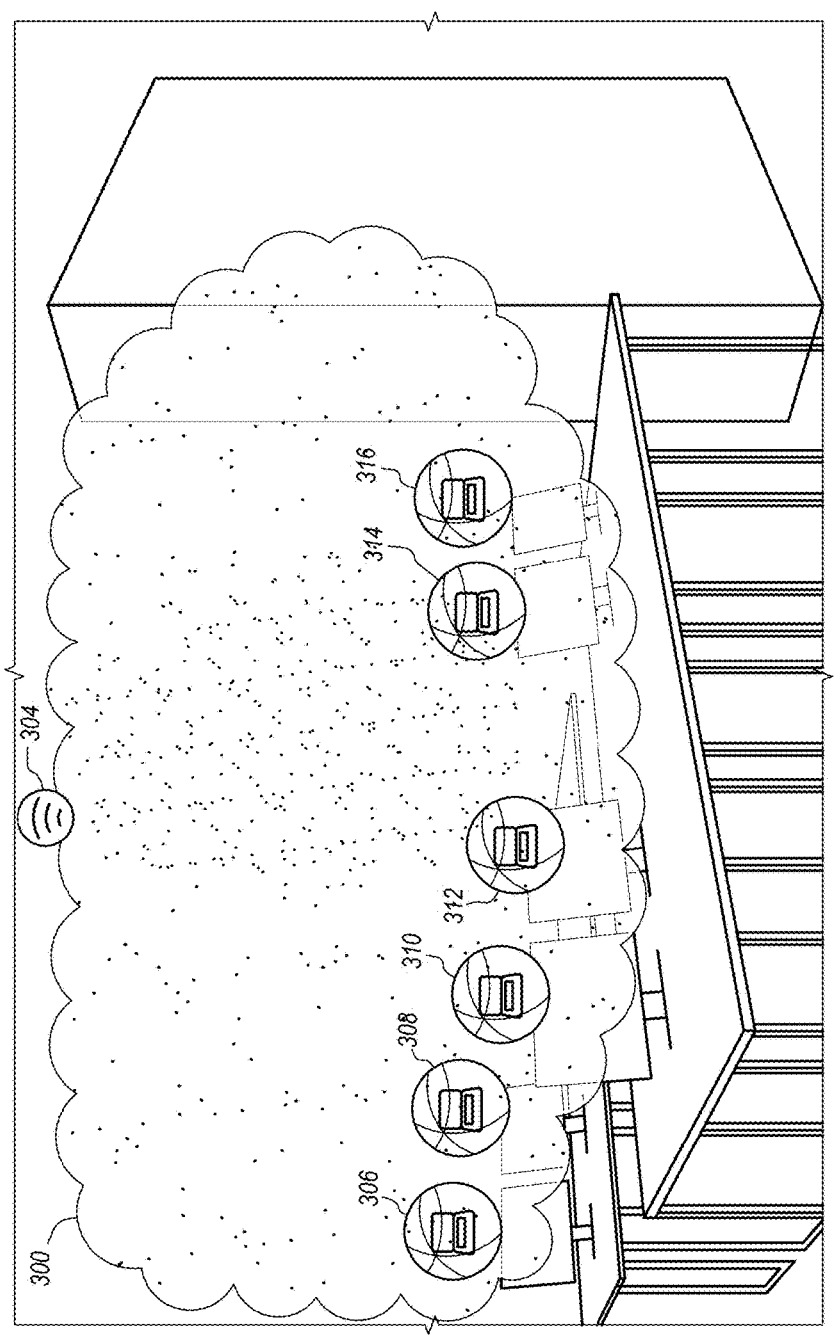
FIG. 3 is an example wireless network graphic visualization, according to one embodiment.

FIG. 3 illustrates an example of a wireless network graphic visualization as can be displayed on an AR client device or VR client device, according to one embodiment. A wireless network graphic visualization is the display of a 3D image, as shown in an AR client device or VR client device. The wireless network visualization may include an access point indicator 304. Access point indicator is a graphic element that identifies the location and/or position of an access point in the physical world. The wireless network visualization may include a wireless coverage area 300. Wireless coverage indicator 300 is a graphic element that is a visual representation that displays the shape, size, channel, and/or signal strength of a wireless network generated by access point indicator 304. Further details regarding the wireless coverage indicator 300 will be described herein. The wireless network visualization may include one or endpoint device indicators 306, 308, 310, 312, 314, and 316. An endpoint device indicator is a graphic element that is a visual representation of an endpoint device in an AR or VR wireless network graphic visualization. Further details regarding the characteristics of an endpoint device indicator will be described herein.

3.1 Wireless Coverage Indicator

Wireless coverage indicator 300 is a graphic element that displays the shape, size, channel, and/or signal strength of a wireless network generated by access point indicator 304. Data collected from the access point associated with access point indicator 304 can be used to generate the wireless coverage indicator 300, including its one or more visual characteristics. In one embodiment, wireless coverage indicator 300 may be represented as a 3D fog effect, as is shown in FIG. 3. The wireless coverage indicator 300 may have various visual characteristics, as determined by the data received from the access point.

The size of the wireless coverage indicator 300 is a visual characteristic that indicates the size of the wireless coverage area generated by an access point. It can be helpful to include the size of the wireless coverage indicator 300 in a wireless network graphic visualization, because it enables a user to view the coverage area of the wireless network.

The shape of the wireless coverage indicator 300 is a visual characteristic that indicates the shape of the wireless coverage area generated by an access point. For example, the shape of the wireless coverage indicator 300 may be affected by real-world barriers that limit the coverage of the wireless coverage area, such as walls of various materials (e.g., cement blocks, stucco, sheet rock, etc.), ceilings, furniture, etc. Thus, the wireless coverage indicator 300 may be displayed with a shape that is consistent with the shape of the wireless coverage area provided by the access point in the physical world. It can be helpful to include the shape of the wireless coverage indicator 300 in a wireless network graphic visualization, as the shape can assist a user in seeing the potential physical barriers to the wireless network, as well as locations of poor signal quality.

The density of the wireless coverage indicator 300 is a visual characteristics that indicates the signal strength of the wireless coverage area generated by an access point. For example, as shown in FIG. 3, the density of the fog effect of wireless coverage indicator 300 may be denser in the middle of the fog and less dense at the periphery, to show the relative strength of the signal strength generated by the access point. The density of the wireless coverage indicator 300 may vary over three dimensions, depending on signal strength. It can be helpful to include the density of the wireless coverage indicator 300 in a wireless network graphic visualization, because it enables a user to view the relative strength of the wireless coverage of a wireless network over a physical setting.

Figure 4:
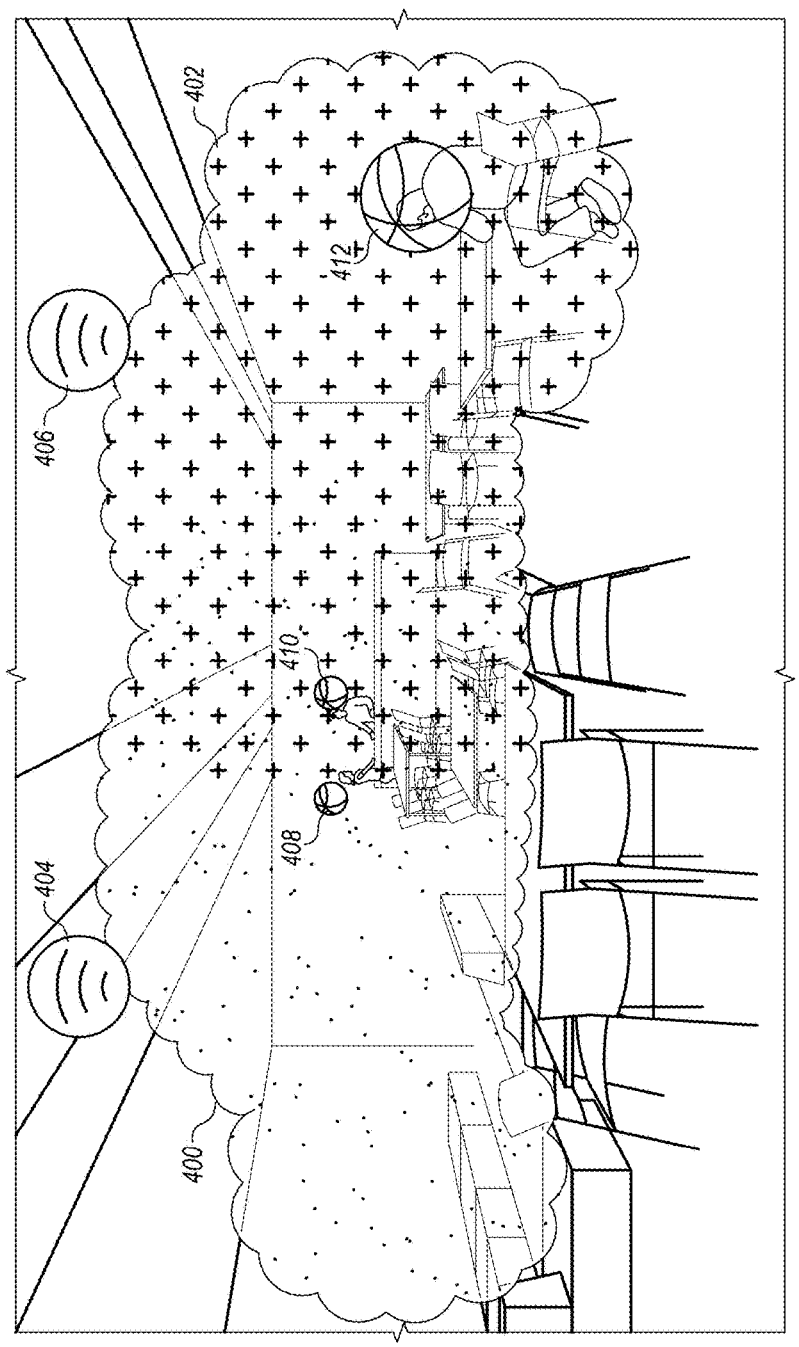
FIG. 4 is an example wireless network graphic visualization, according to one embodiment.

FIG. 4 illustrates an example of a wireless network graphic visualization as can be displayed on an AR client device or VR client device, according to one embodiment. Access point indicators 404 and 406 identify the position of two access points. Endpoint device indicators 408, 410, and 412 indicate the position of endpoint devices. In this example, the access point associated with access point indicator 404 generates wireless coverage indicator 400, and the access point associated with access point indicator 406 generates the wireless coverage indicator 402. The hue, color, or shading of the wireless coverage indicators 400 and 402 are examples of a visual characteristic that indicates the channel of the wireless coverage area generated by each respective access point. Thus, hue, color, or shading can help identify the source of a particular wireless coverage area. For example, in FIG. 4 the wireless coverage indicator 400 is denoted with dots, while the wireless coverage indicator 402 is denoted with "+" symbols. The varying hue, color, or shading of these respective wireless coverage indicators 400 and 402 indicates that the respective access points are operating on different channels or frequencies. Additionally, the varying hue, color, or shading, allows a network administrator to see and distinguish between the multiple wireless coverage areas for each respective access point. In one embodiment, as shown in FIG. 4, the overlapped area between wireless coverage indicators 400 and 402 may show a turbulence or "swirl-like" effect between the respective hue, color, and shading of each wireless coverage area. This turbulence in the depiction of the wireless coverage indicators 400 and 402 can help network administrators identify channel interference between neighboring access points that may affect wireless signal quality. Such channel interferences can cause issues in wireless signal strength. This allows a user to identify potential issues in wireless coverage generated by the access points by identifying locations of channel interference.

3.2 Endpoint Device Indicator

Figure 8:
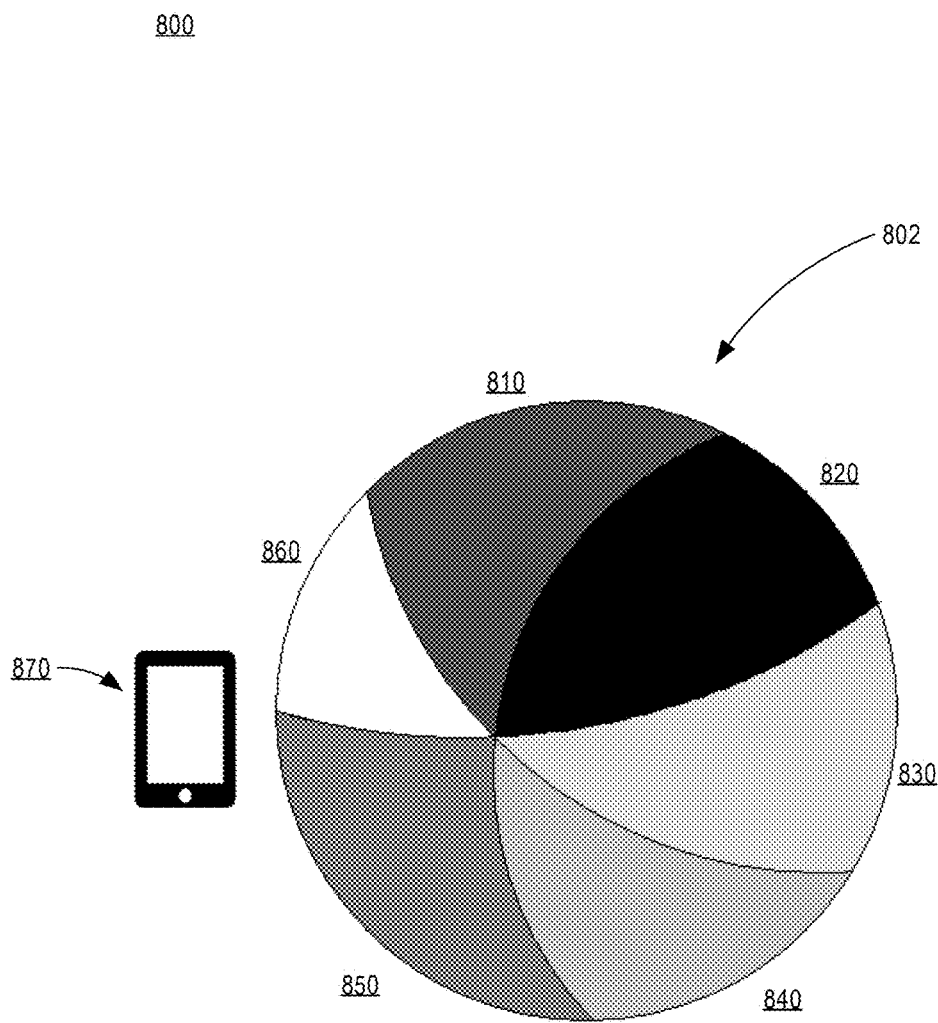
FIG. 8 is an example endpoint device indicator, according to one embodiment.

FIG. 8 illustrates an example of an endpoint device indicator 800, according to one embodiment. An endpoint device indicator may be defined as a graphic element that represents an endpoint device in a wireless network graphic visualization displayed in a virtual reality and/or augmented reality display. Endpoint device indicator 800 may include one or more visual characteristics that convey information regarding the endpoint device. For example, endpoint device indicator 802 includes a shape graphic 802. A shape graphic 802 is one or more graphic subcomponents of the endpoint device indicator 802. In the example of endpoint device indicator 800, shape graphic 802 is a three-dimensional spherical shape, however, in other embodiments, a shape graphic may be implemented as any two-dimensional or three-dimensional shape, such as a pyramid, cylinder, cone, cuboid, rectangle, triangle, oval, etc.

In one embodiment, the position of an endpoint device indicator indicates the position of the endpoint device in the real world. The position of the endpoint device indicator 800 in the wireless network graphic visualization can be determined based on position data received from one or more access points. In one embodiment, the position of an endpoint device is determined based on triangulation using three or more access points. Each access point may receive data containing partial information regarding the position of the endpoint device. Triangulation techniques can be used to determine, based on the data received from the three or more access points, the position of the endpoint device. The position of the endpoint device indicator 800 can include a latitude, a longitude, and an altitude. Thus, the position of a shape graphic is an example of a visual characteristic of an endpoint device indicator that conveys information regarding the spatial positioning of the endpoint device in the real world. In one embodiment, the position of the endpoint device indicator may be adjusted by an enrichment data service, based on supplementary data. Supplementary data may include data regarding the endpoint device, the physical setting of the wireless network, or the users associated with the endpoint device. For example, in one embodiment, the wireless network monitoring system may store supplementary data in a database regarding the height of the user associated with the endpoint device. The wireless network monitoring system may therefore adjust the position of the endpoint device indicator 800, using the height data, in order to display the endpoint device indicator so that it is displayed above the head of the user of the endpoint device instead of obstructing the user in the wireless network graphic visualization.

In one embodiment, the size of a shape graphic can be configured to indicate one or more data consumption characteristics of the endpoint device. For example, the radius, and thus the overall size, of the shape graphic 802 can be determined based upon the amount of data being downloaded by the endpoint device, such as the bitrate of data transfer. Thus, a larger shape graphic would convey information that indicates that the particular endpoint device is downloading more data than a second endpoint device that is represented as a smaller shape graphic. Thus, the size of a shape graphic is an example of a visual characteristic of an endpoint device indicator that conveys information regarding the data consumption of the endpoint device. In another embodiment, the size of a shape graphic can be configured to indicate the amount of data uploaded by the endpoint device.

In one embodiment, wedges of a shape graphic can be configured to indicate the relative data consumption of a particular protocol, process, application, or other subsystem of the endpoint device relative to the overall data consumption. For example, shape graphic 802 includes wedges 810, 820, 830, 840, 850, and 860. In one embodiment, the color, hue, fill, and/or shading of each wedge 810, 820, 830, 840,

850, and 860 may identify the correlated protocol, process, application, or other subsystem of the endpoint device. For example, in shape graphic 802, wedge 810 may indicate data consumption by an email application, wedge 820 may indicate data consumption by a music streaming application, wedge 830 may indicate data consumption by a social media application, wedge 840 may indicate data consumption by a web browser, and wedge 860 may indicate data consumption by a geo-location tool. The relative sizes of the wedges may indicate the relative data consumption by each respective application. Thus, wedges 810, 820, 830, 840, 850, and 860 are an example of a visual characteristic of an endpoint device indicator that conveys information regarding the relative data consumption of particular protocols, process, application, or other subsystems of the endpoint device. In another embodiment, the wedges may represent different data consumption by the endpoint device over different data transfer protocols, such as hypertext transfer protocol (HTTP), hypertext transfer protocol over secure socket layer (HTTPS), file transfer protocol (FTP), etc. In another embodiment, the wedges may represent different data consumption by the endpoint device over different data transfer frequencies (e.g. 802.11 a/b/g/n, Bluetooth, LTE, 3G, CDMA, etc.). The wedges of a shape graphic thus provide a visualization of the relative data consumption of the endpoint device that is easy to understand and dynamically adjusts based on ongoing changes to the endpoint device's ongoing data consumption.

In one embodiment, endpoint device indicator 800 may include one or more icons that provide additional information regarding the endpoint device. An icon is an example of a visual characteristic of an endpoint device indicator 800. For example, endpoint device indicator 800 includes icon 870 that visually depicts that the type of endpoint device associated with endpoint device indicator 800 is a tablet device. Different icons can be used to identify the type of endpoint device associated with the endpoint device indicator 800, such as a tablet, smartphone, desktop computer, laptop, printer, IoT device, wearable device, UAV, or any other type of computing device. The position of the icon may be adjacent to the shape graphic 802 or may superimposed over the shape graphic 802.

Figure 5:
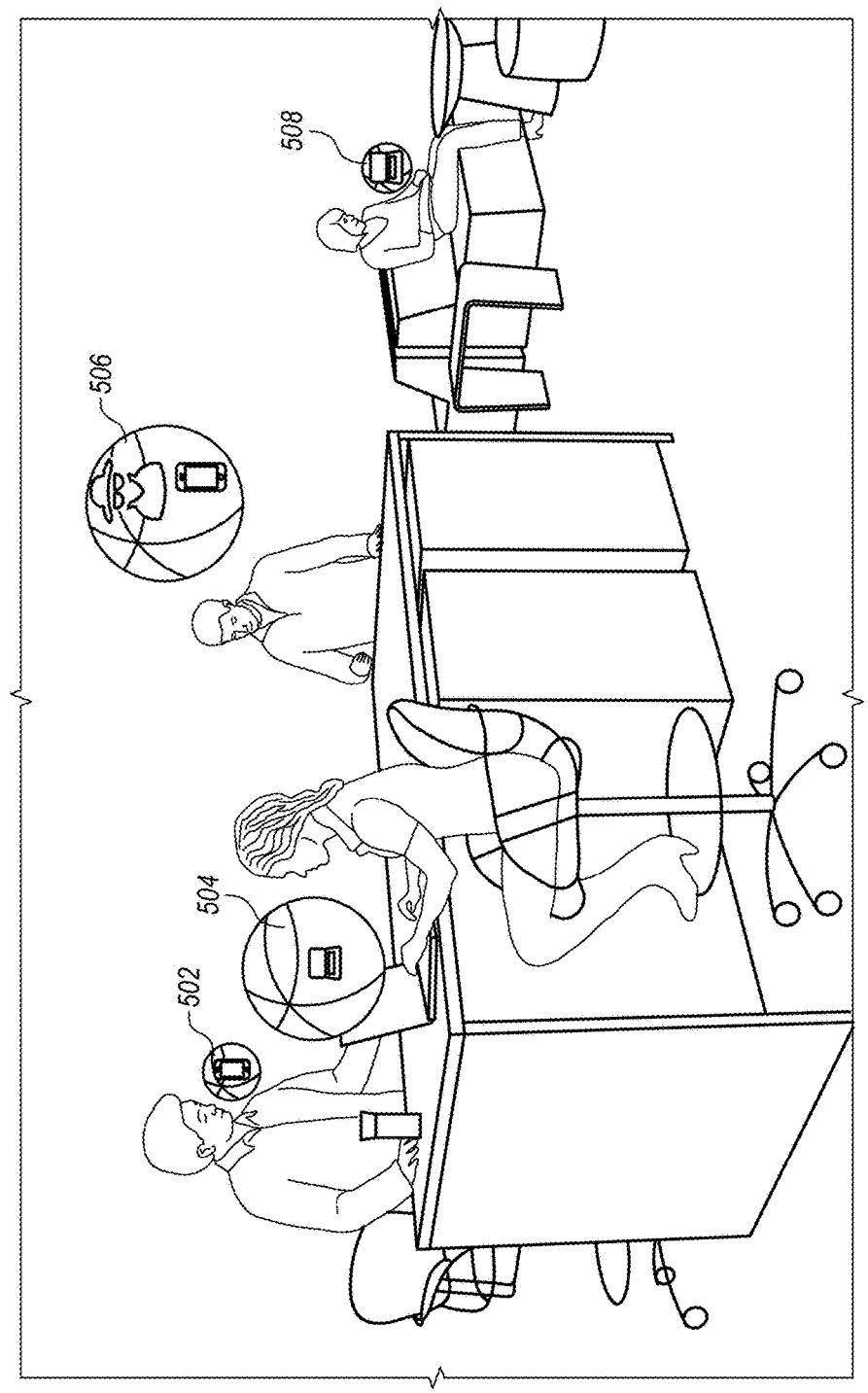
FIG. 5 is an example wireless network graphic visualization, according to one embodiment.

FIG. 5 illustrates an example of a wireless network graphic visualization according to another embodiment. In FIG. 5, the wireless network graphic visualization includes multiple endpoint device indicators 502, 504, 506, and 508 in an augmented reality and/or virtual reality display. In this example, the relatively larger size of the endpoint device indicators 504 and 506 compared to the endpoint device indicators 502 and 508 indicates that the endpoint devices associated with endpoint device indicators 504 and 506 are consuming more data than the endpoint devices associated with endpoint device indicators 502 and 508. Additionally, the icons for endpoint device indicators 502 and 506 indicate that the associated endpoint devices are smartphones, while the icons for endpoint device indicators 504 and 508 indicate that the associated endpoint devices are laptops. Moreover, endpoint device indicator 506 includes a second icon to indicate that it is a rogue device. A rogue device can be any unidentified device that is accessing a particular wireless network. Thus, a rogue device could represent a guest device, or, alternatively, could represent a hostile device that is improperly accessing the wireless network. A rogue device icon thus allows a network administrator or user to quickly identify potential security threats that are accessing a wireless network.

Additional visual characteristics of an endpoint device indicator can be used to convey additional information regarding endpoint devices. In one embodiment, an endpoint device indicator may include visual characteristics related to opacity. In another embodiment, different shapes for an endpoint device indicator may convey additional information regarding the endpoint device indicator. For example, a spherical endpoint device indicator may identify a mobile device, and a cuboid endpoint device indicator may identify a stationary device. Various kinds of information regarding an endpoint device may be displayed as part of a visual characteristic, including endpoint device downloads, endpoint device data uploads, endpoint device uptime, endpoint device signal strength, endpoint device wireless coverage area, endpoint device wireless coverage frequencies, endpoint device permission policy for a given wireless network, and any other characteristic of the endpoint device that can be determined based on data received at one or more access points.

Figure 6:
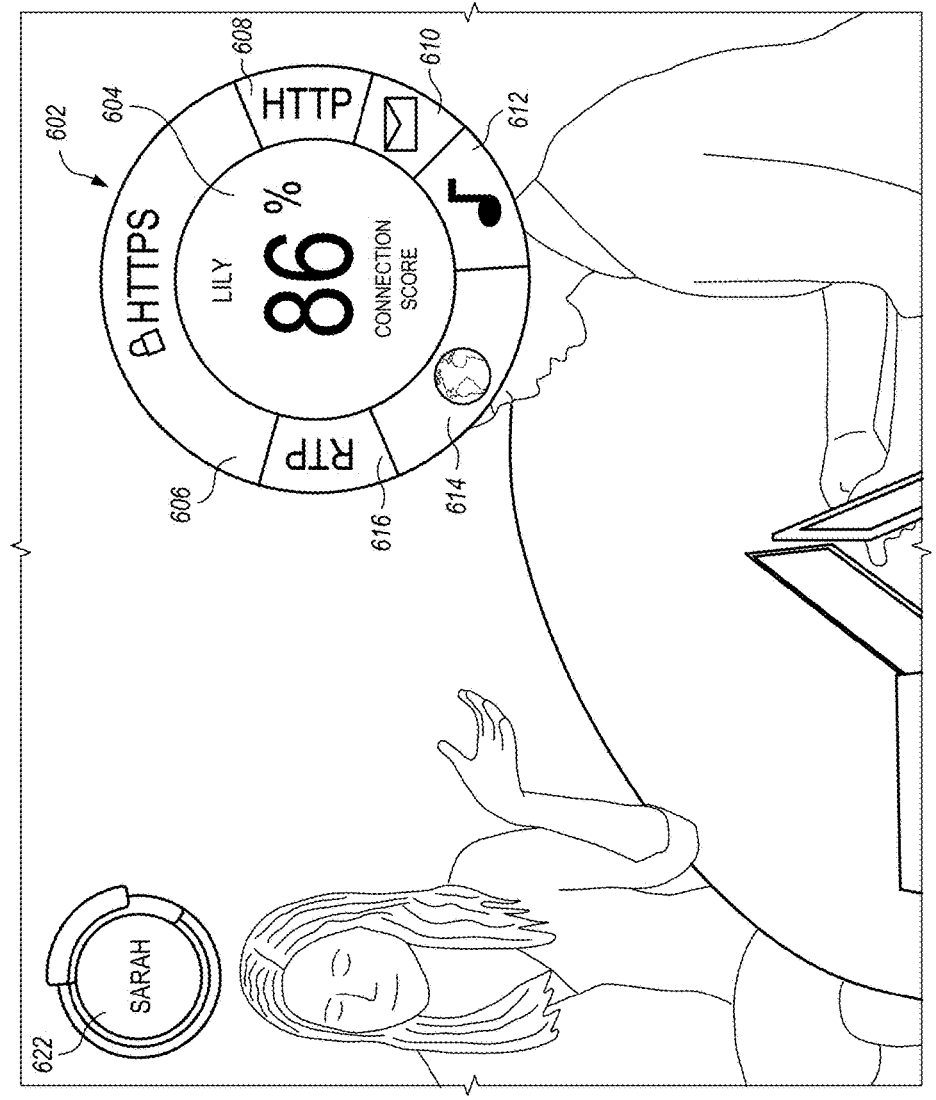
FIG. 6 is an example wireless network graphic visualization, according to one embodiment.

FIG. 6 illustrates another example of a wireless network graphic visualization according to another embodiment. In FIG. 6, multiple endpoint device indicators 602 and 622 in wireless network graphic visualization. In this example, endpoint device indicators 602 and 622 are two-dimensional representations that can be displayed in a 3D wireless network graphic visualization. Endpoint device indicator 622 provides an abbreviated view of the endpoint device, by merely identifying the endpoint device user's name as "Sarah" whereas endpoint device indicator 602 provides a more detailed view. In one embodiment, the detailed view of the endpoint device indicator may be accessible to a user in an augmented reality and/or virtual reality display by interacting with the abbreviated view of the endpoint device indicator. Thus, by interacting with a particular endpoint device indicator, additional information regarding the endpoint device is displayed. Endpoint device indicator 602 includes more detailed information. Wedges 606, 608, 610, 612, 614, and 616 provide additional detail regarding data consumption by the endpoint device associated with endpoint device indicator 602. For the example, the size of the wedges may indicate the amount of data downloaded by a particular protocol, application, service, or other subsystem of the endpoint device. Thus, wedge 602 provides information regarding the amount of data downloaded via HTTPS, wedge 608 provides information regarding the amount of data downloaded via HTTP, and wedge 616 provides information regarding the amount of data downloaded via real-time transfer protocol (RTP). Wedges 610, 612, and 614 provide information regarding the amount of data downloaded via email, music streaming, and web browsing, respectively. Panel 604 is another visual characteristic of the endpoint device indicator 602 that provides information regarding a connection score for the endpoint device indicator. A connection score is a metric used to quantify the connectivity, signal strength, and/or uptime of the endpoint device on the wireless network.

Figure 7:
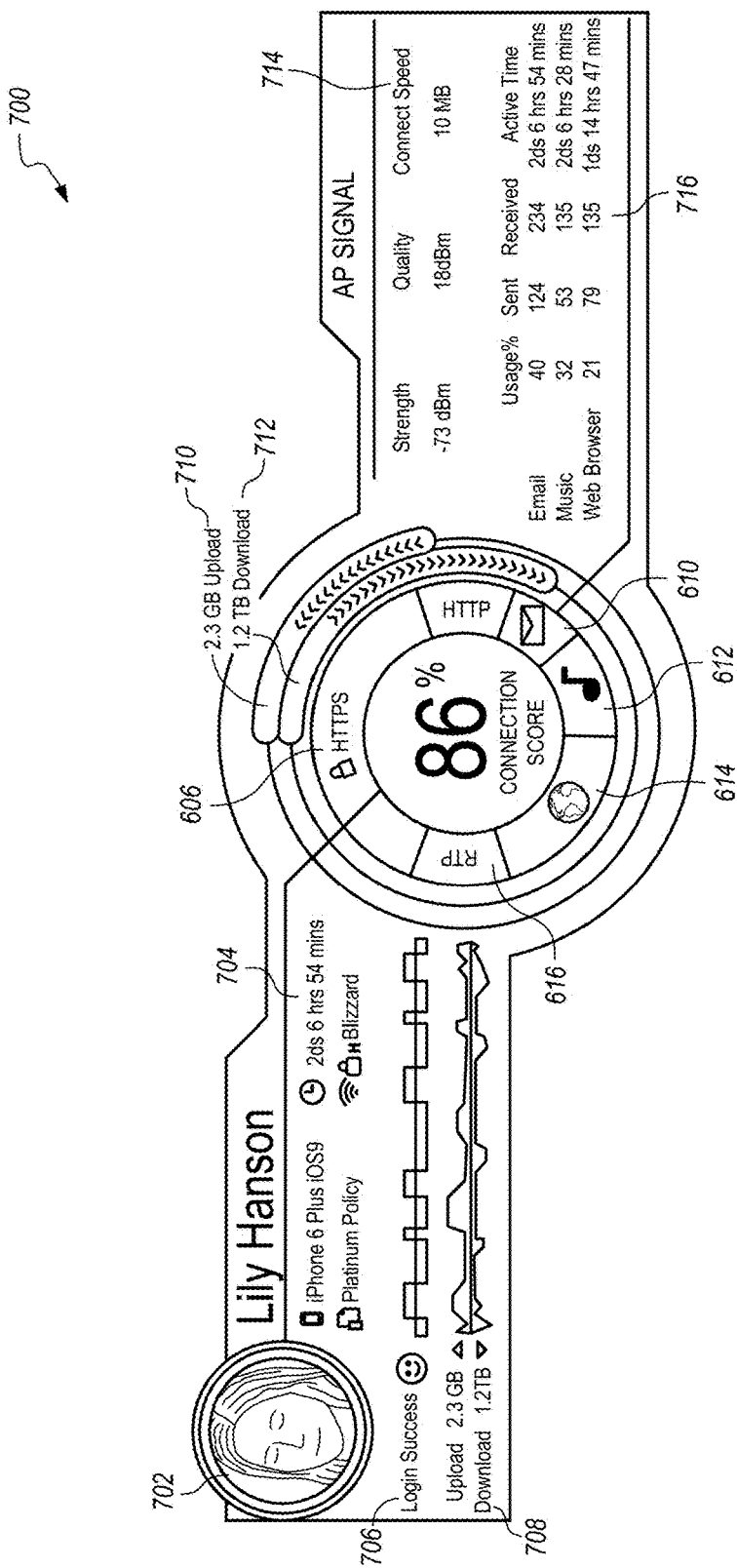
FIG. 7 is an example endpoint device indicator, according to one embodiment.

FIG. 7 illustrates another example of endpoint device indicators 700 in a wireless network graphic visualization displayed in an augmented reality and/or virtual reality display. In this embodiment, endpoint device indicator 700 provides detailed data, via visual characteristics, regarding the endpoint device. Each of these visual characteristics can be determined based on data received at one or more access points and/or data stored in the wireless network monitoring system regarding the endpoint device and its associated user. Endpoint device indicator 700 includes a portrait 702 that identifies the user associated with the endpoint device.

Endpoint device indicator 700 includes a metadata panel 704 that provides information regarding the model and operating system of the endpoint device ("iPhone 6 Plus iOS9"), the uptime of the endpoint device ("2 ds 6 hrs 54 mins"), the permission policy of the endpoint device on the wireless network ("Platinum Policy"), and the name of the access point that the endpoint device is communicating with ("Blizzard"). Endpoint device indicator 700 includes a login timeline 706 that provides historical information regarding the login connectivity of the endpoint device on the wireless network. Endpoint device indicator 700 includes a data transfer timeline 708 that provides historical information regarding the amount of data uploaded and downloaded by the endpoint device over time. Endpoint device indicator 700 also includes data upload summary 710 and data download summary 712 that provide summary information regarding the amount of data uploaded and downloaded by the endpoint device, respectively. Endpoint device indicator 700 includes a access point signal panel 714 that provides a summary of the signal strength to the access point, the quality of the signal to the access point, and the connect speed to the access point. Endpoint device indicator 700 also includes data usage summary 716 that provides a summary of the data usage of the endpoint device across protocols, applications, or other subsystems. Endpoint device indicator also includes wedges 606, 610, 612, 614, and 616 for displaying information regarding data download consumption by the endpoint device.

4.0 Example Process

Figure 9:
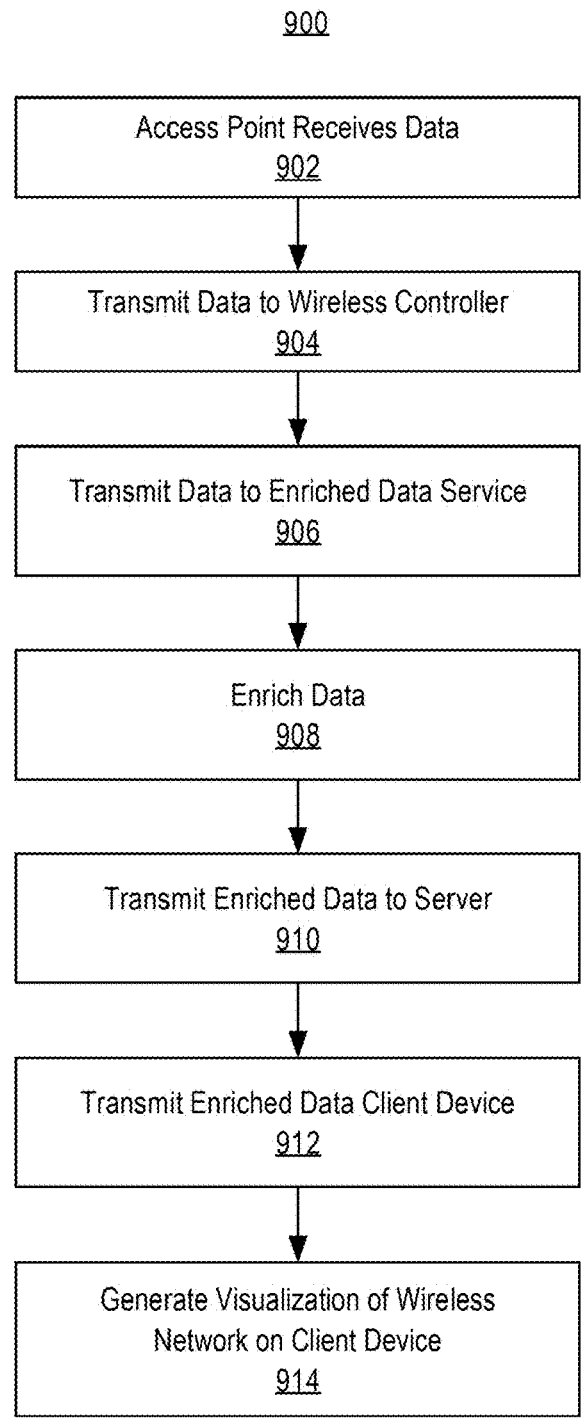
FIG. 9 is a flow diagram for a process of displaying a wireless network graphic visualization, according to one diagram.

FIG. 9 shows an example flow diagram for a process 900 of generating a graphic visualization of the wireless network, according to one embodiment.

In step 902, one or more access points receive or generate data regarding a wireless network. The data may include position data regarding the position of one or more endpoint devices accessing the wireless network. In one embodiment, the position data may be determined by the access point based on triangulation of the position of the endpoint device, as determined based on the RSSI detected for communication to the endpoint device from three or more access points. In another embodiment the position data may be determined based on the angle of arrival of the wireless signal between a single access point and the endpoint device in addition to the RSSI of the data packet received at the access point. The data may include packet sniffing data determined from data packets received from or sent to the endpoint device. The data may include wireless coverage data regarding characteristics of the wireless coverage area generated by the access point, such as size, shape, signal strength, or channel. Once the access point receives such data, the process 900 may proceed to step 904.

In step 904, the one or more access points transmit the data received in step 902 to a wireless controller. The process 900 may proceed to step 906.

In step 906, the wireless controller may transmit the data to an enriched data service 906. The process 900 may proceed to step 908.

In step 908, the enriched data service may optionally enrich the data received from the wireless controller with supplementary data. Supplementary data may be received from a database coupled to the enriched data service or an analytics system coupled to the enriched data service. Supplementary data may include historical data regarding endpoint devices, user information, employment records, data regarding the physical layout of the location of the wireless network, permission policies, or any other ancillary information that may be visualized. The process 900 may proceed to step 910.

In step 910, the enriched data service transmits the enriched data to a server that is accessible to one or more AR or VR client devices. The process 900 may proceed to step 912.

In step 912, the server transmits the enriched data to one or more client devices. The process 900 may proceed to step 914.

In step 914, the AR or VR client device uses the enriched data to generate a 3D graphic visualization of the wireless network. The graphic visualization may include a wireless coverage indicator may include visual characteristics to identify the shape, size, signal strength, and/or channel of the wireless coverage area generated by the access point(s). The 3D graphic visualization may include one or more endpoint device indicators that include visual characteristics that are determined based on properties of the endpoint device, such as the position, shape, size, data consumption, permission policy, or any other feature of the endpoint device or the user using the endpoint device. The process 900 may then end.

5.0 Example Applications

The present disclosure allows for a user to view the configuration and performance of a wireless network in an immersive 3D graphic visualization. The use of 3D technologies, such as augmented reality or virtual reality, allows for dynamic, immersive, and detailed wireless network monitoring that is not possible on 2D systems. The present disclosure can be used in various application areas to allow network administrators and other users in monitoring, troubleshooting, and/or configuring a wireless network in any sort of physical environment. For example, application areas could include monitoring wireless networks in airports, public places, schools, retail shopping malls, and offices.

The 3D wireless network monitoring system provides numerous advantages over existing network monitoring systems. Network administrators can use the present 3D wireless network monitoring system to view data consumption by endpoint devices based on application, protocol, or technology in a 3D environment. Similarly, network administrator can easily identify rogue devices to monitor potential security threats and risks. Likewise, network administrators can use the 3D wireless network monitoring system to view permission policies of endpoint devices using a wireless network in real-time.

In one embodiment, a recording of the wireless network monitoring can be made and played back at a later time via an AR or VR client device. This allows a user to view the changes affecting the wireless network over a particular time period at a later time. The recording thereby assists a user in troubleshooting issues that were encountered in the wireless network.

Likewise, a user can use the present system for configuring a wireless network. Endpoint device indicators can assist a user in identifying physical traffic patterns and usage in a wireless network. Based on this information, a user can reconfigure the positioning of access points to accommodate areas of high demand. Similarly, a user can view the wireless coverage indicator to identify physical barriers to wireless coverage, such as walls, furniture, ceilings, etc., in order to determine if reconfiguration of the access points would be beneficial.

The wireless network monitoring system provides numerous improvements and efficiencies over existing wireless management applications. The wireless network monitoring system allows users to easily view patterns where endpoint devices consume wireless data and what types of data is consumed. The wireless network monitoring system allows users to efficiently view signal strength relative to user consumption in a wireless network. The wireless network monitoring system allows users to visually see the size and shape of wireless coverage areas. The wireless network monitoring system allows users to view interference of wireless coverage between access points. The wireless network monitoring system allows users to observe network usage over time. The wireless network monitoring system allows users to observe and block rogue devices. The wireless network monitoring system allows users to reconfigure access point deployment to maximize wireless coverage and improve data consumption by endpoint devices.

6.0 Implementation Mechanisms—Hardware Overview

Figure 10:
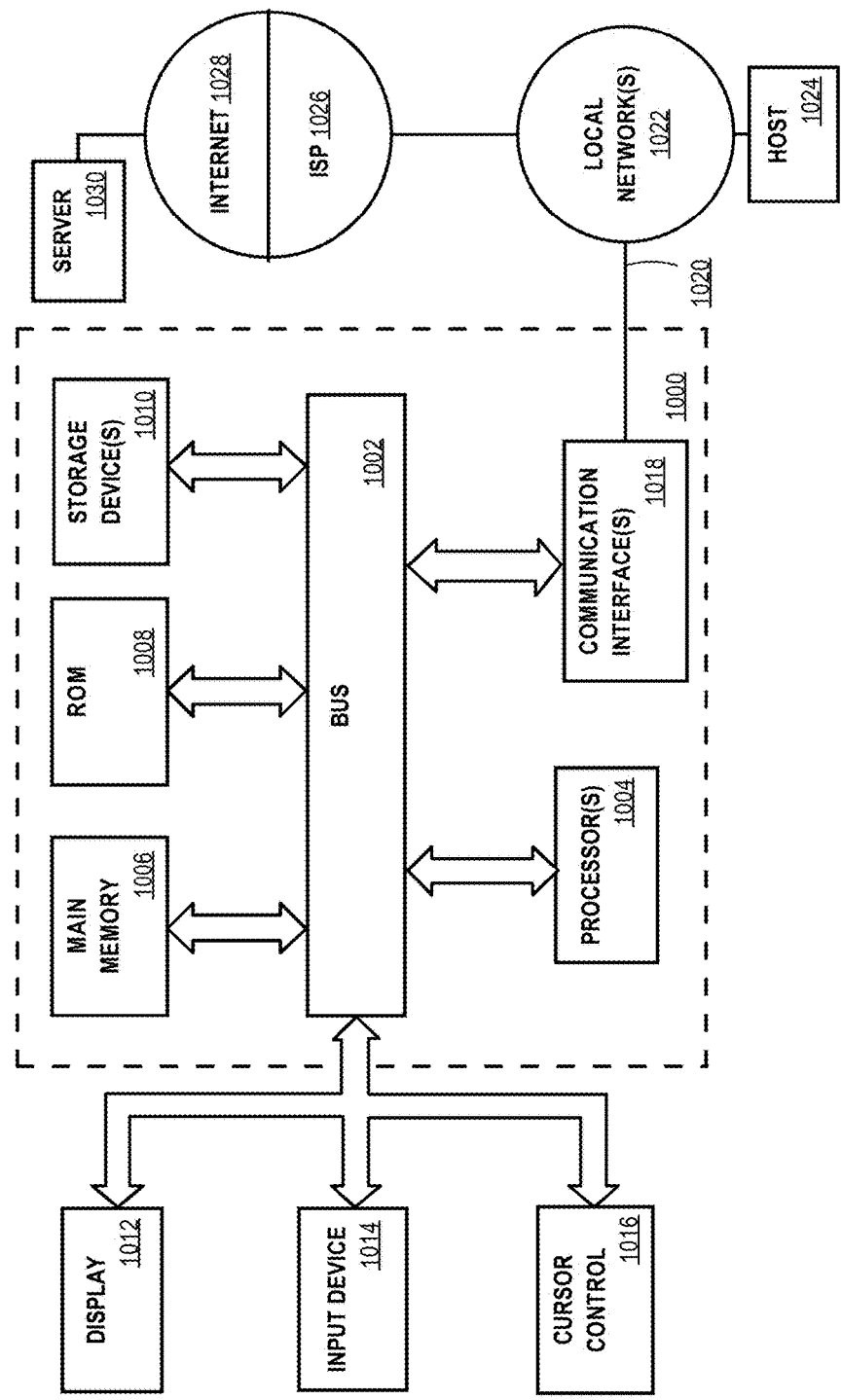
FIG. 10 is a block diagram of a computing device in which the example embodiment(s) of the present invention may be embodied.

Referring now to FIG. 10, it is a block diagram that illustrates a computing device 1000 in which the example embodiment(s) of the present invention may be embodied. Computing device 1000 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1000 may include a bus 1002 or other communication mechanism for addressing main memory 1006 and for transferring data between and among the various components of device 1000.

Computing device 1000 may also include one or more hardware processors 1004 coupled with bus 1002 for processing information. A hardware processor 1004 may be a general purpose microprocessor, a system on a chip (SoC), or other processor.

Main memory 1006, such as a random access memory (RAM) or other dynamic storage device, also may be coupled to bus 1002 for storing information and software instructions to be executed by processor(s) 1004. Main memory 1006 also may be used for storing temporary variables or other intermediate information during execution of software instructions to be executed by processor(s) 1004.

Software instructions, when stored in storage media accessible to processor(s) 1004, render computing device 1000 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1000 also may include read only memory (ROM) 1008 or other static storage device coupled to bus 1002 for storing static information and software instructions for processor(s) 1004.

One or more mass storage devices 1010 may be coupled to bus 1002 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1010 (e.g., the main hard disk for the device) stores a body of program and data for directing operation of the computing device, including an operating system, user application programs, driver and other support files, as well as other data files of all sorts.

Computing device 1000 may be coupled via bus 1002 to display 1012, such as a liquid crystal display (LCD) or other electronic visual display, for displaying information to a computer user. In some configurations, a touch sensitive surface incorporating touch detection technology (e.g., resistive, capacitive, etc.) may be overlaid on display 1012 to form a touch sensitive display for communicating touch gesture (e.g., finger or stylus) input to processor(s) 1004.

An input device 1014, including alphanumeric and other keys, may be coupled to bus 1002 for communicating information and command selections to processor 1004. In addition to or instead of alphanumeric and other keys, input device 1014 may include one or more physical buttons or switches such as, for example, a power (on/off) button, a "home" button, volume control buttons, or the like.

Another type of user input device may be a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

While in some configurations, such as the configuration depicted in FIG. 10, one or more of display 1012, input device 1014, and cursor control 1016 are external components (i.e., peripheral devices) of computing device 1000, some or all of display 1012, input device 1014, and cursor control 1016 are integrated as part of the form factor of computing device 1000 in other configurations.

Functions of the disclosed systems, methods, and modules may be performed by computing device 1000 in response to processor(s) 1004 executing one or more programs of software instructions contained in main memory 1006. Such software instructions may be read into main memory 1006 from another storage medium, such as storage device(s) 1010. Execution of the software instructions contained in main memory 1006 cause processor(s) 1004 to perform the functions of the example embodiment(s).

While functions and operations of the example embodiment(s) may be implemented entirely with software instructions, hard-wired or programmable circuitry of computing device 1000 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more software instructions to processor(s) 1004 for execution. For example, the software instructions may initially be carried on a magnetic disk or solid-state drive of a remote computer. The remote computer can load the software instructions into its dynamic memory and send the software instructions over a telephone line using a modem. A modem local to computing device 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor(s) 1004 retrieves and executes the software instructions. The software instructions received by main memory 1006 may optionally be stored on storage device(s) 1010 either before or after execution by processor(s) 1004.

Computing device 1000 also may include one or more communication interface(s) 1018 coupled to bus 1002. A communication interface 1018 provides a two-way data communication coupling to a wired or wireless network link 1020 that is connected to a local network 1022 (e.g., Ethernet network, Wireless Local Area Network, cellular phone network, Bluetooth wireless network, or the like). Communication interface 1018 sends and receives electrical, electromagnetic, or optical signals that carry digital data streams representing various types of information. For example, communication interface 1018 may be a wired network interface card, a wireless network interface card with an integrated radio antenna, or a modem (e.g., ISDN, DSL, or cable modem).

Network link(s) 1020 typically provide data communication through one or more networks to other data devices. For example, a network link 1020 may provide a connection through a local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network(s) 1022 and Internet 1028 use electrical, electromagnetic or optical signals that carry digital data streams. The signals through the various networks and the signals on network link(s) 1020 and through communication interface(s) 1018, which carry the digital data to and from computing device 1000, are example forms of transmission media.

Computing device 1000 can send messages and receive data, including program code, through the network(s), network link(s) 1020 and communication interface(s) 1018. In the Internet example, a server 1030 might transmit a requested code for an application program through Internet 1028, ISP 1026, local network(s) 1022 and communication interface(s) 1018.

The received code may be executed by processor 1004 as it is received, and/or stored in storage device 1010, or other non-volatile storage for later execution.

7.0 Implementation Mechanisms—Software Overview

FIG. 11 is a block diagram of a software system 1100 that may be employed for controlling the operation of computing device 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing device 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on device 1100 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of device 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the device 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of device 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8.0 Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
 receiving first endpoint device data at one or more access points, wherein the first endpoint device data comprises first position data regarding a first real-time position of an endpoint device, wherein the endpoint device is capable of changing physical world positions;
 receiving wireless coverage data at the one or more access points;
 transmitting the first endpoint device data to a client device, wherein, the first endpoint device data being received by the client device causes the client device to display an endpoint device indicator in a three dimensional graphic visualization using a first set of visual characteristics determined based on the first endpoint device data;
 wherein the endpoint device indicator is a visual representation of the endpoint device;
 wherein the endpoint device is a different device than the client device;
 transmitting the wireless coverage data to the client device, wherein, when the wireless coverage data is received by the client device, causes the client device to display a wireless coverage indicator in the three dimensional graphic visualization using a second set of visual characteristics determined based on the wireless coverage data;
 wherein the wireless coverage indicator is a visual representation of a wireless coverage area generated by the one or more access points;
 receiving second endpoint device data at the one or more access points, wherein the second endpoint device data comprises second position data regarding a second real-time position of an endpoint device, the second position data being different than the first position data;
 transmitting the second endpoint device data to the client device; and
 in response to transmitting the second endpoint device data, updating the displayed endpoint device indicator of the client device using a third set of visual characteristics that are determined based at least in part on the second endpoint device data.

2. The method of claim 1, wherein the client device is an augmented reality client device.

3. The method of claim 1, wherein the client device is a virtual reality client device.

4. The method of the claim 1, wherein:
 the first and third set of visual characteristics comprise a position of the endpoint device indicator that is determined based on the position data.

5. The method of claim 4, further comprising:
 receiving a set of received signal strength indicators (RSSI) from three or more access points; and
 determining the first and second position data by triangulating the position of the endpoint device using the set of received signal strength indicators (RSSI).

6. The method of claim 4, further comprising:
 receiving a received signal strength indicator (RSSI) from a particular access point;
 receiving an angle of arrival of a wireless signal between the particular access point and the endpoint device; and
 determining the first and second position data based on the RSSI from the particular access point and the angle of arrival.

7. The method of claim 1, wherein the first and second endpoint device data comprise data determined from sniffing data packets transmitted between an access point of the one or more access points and the endpoint device.

8. The method of claim 1, wherein:
 the first and second endpoint device data comprise information regarding an amount of data downloaded by a particular endpoint device; and
 the first and third set of visual characteristics comprises a size of the endpoint device indicator that is determined based on the amount of data downloaded by the particular endpoint device.

9. The method of claim 1, wherein:
the wireless coverage data comprises information regarding a channel of a wireless coverage area generated by a particular access point of the one or more access points; and
the second set of visual characteristics comprises a color of the wireless coverage indicator, wherein the color identifies the channel of the wireless coverage area generated by the particular access point of the one or more access points.

10. The method of claim 1, wherein:
the wireless coverage data comprises information regarding a signal strength of a wireless coverage area generated by a particular access point of the one or more access points; and
the second set of visual characteristics comprises a density of the wireless coverage indicator, wherein the density indicates the signal strength of the wireless coverage area generated by the particular access point of the one or more access points.

11. A wireless network monitoring system comprising:
a plurality of computers;
one or more non-transitory data storage media in the plurality of computers storing logic comprising one or more sequences of instructions which when executed cause the computers to perform:
receiving first endpoint device data at one or more access points, wherein the first endpoint device data comprises first position data regarding a first real-time position of an endpoint device, wherein the endpoint device is capable of changing physical world positions;
receiving wireless coverage data at the one or more access points;
transmitting the first endpoint device data to a client device, wherein, the first endpoint device data being received by the client device causes the client device to display an endpoint device indicator in a three dimensional graphic visualization using a first set of visual characteristics determined based on the endpoint device data;
wherein the endpoint device indicator is a visual representation of the endpoint device;
wherein the endpoint device is a different device than the client device;
transmitting the wireless coverage data to the client device, wherein, when the wireless coverage data is received by the client device, causes the client device to display a wireless coverage indicator in the three dimensional graphic visualization using a second set of visual characteristics determined based on the wireless coverage data;
wherein the wireless coverage indicator is a visual representation of a wireless coverage area generated by the one or more access points;
receiving second endpoint device data at the one or more access points, wherein the second endpoint device data comprises second position data regarding a second real-time position of an endpoint device, the second position data being different than the first position data;
transmitting the second endpoint device data to the client device; and
in response to transmitting the second endpoint device data, updating the displayed endpoint device indicator of the client device using a third set of visual characteristics that are determined based at least in part on the second endpoint device data.

12. The wireless network monitoring system of claim 11, wherein the client device is an augmented reality client device.

13. The wireless network monitoring system of claim 11, wherein the client device is a virtual reality client device.

14. The wireless network monitoring system of claim 11, wherein:
the first and third set of visual characteristics comprise a position of the endpoint device indicator that is determined based on the position data.

15. The wireless network monitoring system of claim 11, further comprising:
receiving a set of received signal strength indicators (RSSI) from three or more access points; and
determining the first and second position data by triangulating the position of the endpoint device using the set of received signal strength indicators (RSSI).

16. The wireless network monitoring system of claim 11, further comprising:
receiving a received signal strength indicator (RSSI) from a particular access point;
receiving an angle of arrival of a wireless signal between the particular access point and the endpoint device; and
determining the first and second position data based on the RSSI from the particular access point and the angle of arrival.

17. The wireless network monitoring system of claim 11, wherein the first and second endpoint device data comprise data determined from sniffing data packets transmitted between an access point of the one or more access points and the endpoint device.

18. The wireless network monitoring system of claim 11, wherein:
the first and second endpoint device data comprise information regarding an amount of data downloaded by a particular endpoint device; and
the first and third set of visual characteristics comprises a size of the endpoint device indicator that is determined based on the amount of data downloaded by the particular endpoint device.

19. The wireless network monitoring system of claim 11, wherein:
the wireless coverage data comprises information regarding a channel of a wireless coverage area generated by a particular access point of the one or more access points; and
the second set of visual characteristics comprises a color of the wireless coverage indicator, wherein the color identifies the channel of the wireless coverage area generated by the particular access point of the one or more access points.

20. The wireless network monitoring system of claim 11, wherein:
the wireless coverage data comprises information regarding a signal strength of a wireless coverage area generated by a particular access point of the one or more access points; and
the second set of visual characteristics comprises a density of the wireless coverage indicator, wherein the density indicates the signal strength of the wireless coverage area generated by the particular access point of the one or more access points.

* * * * *